United States Patent Office 3,458,572
Patented July 29, 1969

3,458,572
TETRACYCLINE RECOVERY PROCESS
Alvin J. O'Donnell, Johnston, R.I., assignor to Chas.
Pfizer & Co., Inc., New York, N.Y., a corporation
of Delaware
No Drawing. Filed Aug. 3, 1966, Ser. No. 569,801
Int. Cl. C07c 103/02
U.S. Cl. 260—559
8 Claims

ABSTRACT OF THE DISCLOSURE

Recovery of a tetracycline antibiotic from an aqueous medium containing a fermentation produced tetracycline antibiotic obtained from a filtered and decalcified fermentation broth by reacting at least a molar equivalent amount of a quaternary ammonium salt therewith at a pH of from about 5 to about 12.

---

This invention relates to an improved process for recovering tetracycline-type antibiotics. More particularly, the present invention concerns an improved process for recovering tetracycline-type antibiotics, which form quaternary ammonium complexes, from aqueous solutions and suspensions thereof.

The object of this invention is to provide a method for selectively extracting tetracycline-type antibiotics from fermentation broths containing the same by complexing the antibiotic with a new type of quaternary ammonium salt. The quaternary ammonium salts useful in this invention are trimethyl (2-methyl long chain alkyl) ammonium halides commonly known as quaternized beta-amines. We have unexpectedly found that these quaternary beta-amines are much more selective in complexing the tetracycline-type antibiotic contained in decalcified fermentation broth filtrates, than are the long straight-chain alkyl trimethyl ammonium halides normally used for complexing these antibiotics. Furthermore, we have found that the selectivity of these quaternized beta-amines is of such a degree that the further processing steps normally required to purify the tetracycline-extracted by complexing with quaternary ammonium salts such as washing the tetracycline cake with alcohol, decolorizing with carbon and various bleaching steps known to those familiar with the art, can be eliminated without sacrificing product quality. Still another object of this invention is to provide a method for obtaining an antibiotic with a much lower residual quaternary ammonium salt content. We have also found that the process of this invention yields antibiotics having higher bio-potency and improved color over antibiotics obtained by complexing the antibiotic with a trimethyl long straight-chain alkyl quaternary ammonium salt. Another object of this invention is to provide a method for obtaining increased yields of recovered antibiotic from fermentation broths. The increased yields of usable antibiotic which we obtain by our process are attributable to our obtaining a pure product which does not require repeated recrystallizations with their attendant losses in product.

The use of trimethyl long straight-chain alkyl quaternary ammonium salts for extracting tetracycline-type antibiotics is disclosed in U.S. Patents 2,875,247, 2,734,018, 2,871,264 and 2,873,276. U.S. Patent 2,875,247, issued to Sidney Martin Fox et al., claims a method for extracting tetracycline and chlortetracycline by complexing the antibiotic in a decalcified fermentation mash at a pH of from about 5.5 to 11 with a quaternary ammonium salt, extracting the complex with a methyl alkyl ketone, separating the ketone and isolating the antibiotic therefrom. Various methods are disclosed in this patent for purifying the chlortetracycline and tetracycline obtained by this process For example, the chlortetracycline crystals obtained from the complex by acidification require washing with water, a lower alkoxy lower alkanol and finally washing with a lower alkanol before being vacuum dried. Furthermore, the dried crystals are described as requiring further treatment with a reducing agent to bleach the colored impurities which are carried along in this process. Tetracycline crystals prepared by the process of the invention are disclosed as requiring further slurring in butanol, 2-ethoxyethanol and hydrochloric acid to obtain specification quality tetracycline. In addition, the process as disclosed in the examples of this patent requires treatment with a filter aid followed by repeated solvent extracts to obtain a suitable product.

U.S. Patent 2,734,018, issued to Pasquale Paul Minieri et al., discloses the use of mixtures of alkyl trimethylammonium chlorides and dialkyl-dimethylammonium chlorides in extracting tetracycline from a filtrate obtained from a fermentation broth. This patent discloses the use of methanol to wash the crystallized tetracycline hydrochloride obtained from the complex free of color. U.S. Patent 2,871,264, issued to Pasquale P. Minieri et al., discloses the preparation of tetracycline-quaternary ammonium complexes with various quaternary ammonium salts containing at least one long straight-chain alkyl group. U.S. Patent 2,873,276, issued to Edwin W. Blase, claims the use of straight-chain alkyl quaternary ammonium salts for complexing with oxytetracycline.

The present invention relates to a process for obtaining a complex of a tetracycline antibiotic from an aqueous medium containing a fermentation-produced tetracycline antibiotic obtained from a filtered and decalcified fermentation broth by reacting at least a molar equivalent amount of a quaternary ammonium salt therewith at a pH of from about 5 to about 12, where the quaternary ammonium salt has the formula:

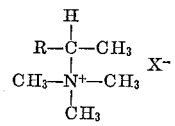

wherein R is alkyl having from 9 to 18 carbon atoms and X is chloride, bromide or iodide. By the term fermentation-produced tetracycline antibiotics is, of course, meant those tetracycline antibiotics produced by fermentation and which include tetracycline, oxytetracycline, chlortetracycline and 7 - chloro - 6 - demethyltetracycline. More specifically, this invention concerns the process where the pH is between about 8 and 11. Furthermore, this invention specifically includes the process wherein the aforesaid antibiotic quaternary ammonium complex is allowed to precipitate and is filtered from the aqueous system. This invention also includes the process where the antibiotic quaternary ammonium complex is contacted with a water-immiscible polar organic solvent so as to extract the antibiotic quaternary ammonium complex from the aqueous medium, separating the solvent extract, and thereafter isolating the antibiotic from the solvent extract. The invention specifically includes the process where the antibiotic is tetracycline, where the antibiotic is oxytetracycline, chlortetracycline and also where the antibiotic is 7-chloro-6-demethyltetracycline.

A specific embodiment of this invention comprises decalcifying a fermentation broth containing tetracycline, oxytetracycline, chlortetracycline or 7-chloro-6-demethyltetracycline by adding oxalic acid or a soluble salt of oxalic acid thereto to precipitate calcium oxalate and filtering the broth. It is also possible, but not preferred, to obtain the antibiotic quaternary complex by this process from the whole broth without decalcifying and filtering.

As is well known to those familiar with the fermentation art, there is present in the fermentation broth and filtrate a small concentration of magnesium ion. We have found that the small amount of magnesium ion normally present in the broth facilitates the procedure of the present invention. After decalcifying and filtering the resulting filtrate is adjusted to a pH of from about 5 to 12 and preferably between 8 and 11 with a basic reagent and a molar equivalent amount of a quaternized beta-amine is added thereto. The aqueous filtrate may also be adjusted to the aforesaid pH after the addition of the quaternary ammonium salt. While less than a molar equivalent amount of the salt may be added to the mixture, the most efficient and economical method comprises adding at least a molar equivalent amount and preferably an excess of the salt to the filtrate.

Salts particularly useful in this invention are trimethyl 2-methyl-alkylammonium chlorides where alkyl has from about 10 to about 19 carbon atoms. Illustrative compounds are trimethyl 2-methyldecylammonium chloride, trimethyl 2-methyltetradecylammonium chloride, trimethyl 2-methylhexadecylammonium chloride, trimethyl 2-methylnonadecylammonium chloride and the like. Although the chloride salts are the preferred and illustrated salts, the iodides, bromides, sulfates and nitrates can be used when available. Many of the quaternary ammonium compounds of this invention are available commercially, as mixtures, from the Armour Chemical Division of Armour and Company. These mixtures are sold under the tradename Arquad L-11 and Arquad L-15. Arquad L-11 is understood to be a mixture consisting mainly of trimethyl 2 - methylalkylammonium chlorides where alkyl has from about 10 to about 13 carbon atoms. Arquad L-15 is understood to be a mixture consisting mainly of trimethyl 2-methylalkylammonium chlorides where alkyl has from about 14 to about 19 carbon atoms. As those skilled in the art will know, such quaternary ammonium salts may be prepared by reacting α-olefins obtained from petroleum with hydrogen chloride to obtain the 2-methyl-long chain alkyl chloride. This product can be reacted with dimethylamine to obtain N,N-dimethyl-2-methyl-long chain alkylamine which is quaternized with a methyl halide, such as methyl iodide, to obtain the trimethyl-2-methylalkylammonium halide.

The reaction mixture obtained by adding the quaternary ammonium salt to the filtrate is allowed to react for from about 15 minutes to several hours depending on the size of the sample. Of course, longer periods of time result in some degradation of product. Generally, from 15 to 30 minutes is sufficient to react a 10,000 to 25,000 gallon batch of the filtrate with adequate agitation. The colloidal precipitate of the complex which results may be filtered from the mixture and dried. Filtering and drying are accomplished by any of those methods which are familiar to those skilled in the art. Preferably, a filter press is used for production-size runs and a vacuum oven is used to dry the filter cake. Significant economies in process time are realized thereby. The antibiotic-quaternary complex as a dried cake, is useful for animal feeds and for storing the product in stable form. The antibiotic-quaternary ammonium complex in the reaction mixture may also be contacted with a water-immiscible polar organic solvent so as to extract the complex from the aqueous system. The organic solvent solution is separated and the antibiotic may be isolated from the complex in solution.

When the antibiotic is to be used in its salt form or as the base, the aqueous mixture of antibiotic-quaternary complex in the filtrate is extracted with a water-immiscible, polar organic solvent. A wide variety of such solvents are suitable for the present invention and the choice thereof is not particularly critical. Preferred solvents, on the basis of availability, include saturated aliphatic ketones having at least 5 and up to 7 carbon atoms such as methyl isopropyl ketone, methyl isobutyl ketone, di-isopropyl ketone and methyl isoamyl ketone. Water-immiscible aliphatic acetate esters having from 5 to 7 carbon atoms such as n-butyl acetate, isobutyl acetate, amyl acetate and n-propyl acetate are also effective. Preferred alkanols are those having from 4 to 5 carbon atoms such as n-butyl alcohol, isobutyl alcohol, secondary butyl alcohol and amyl alcohol. Aromatic hydrocarbons, such as benzene, toluene and xylene, are also effective, as are chlorinated hydrocarbons such as chloroform, ethylene dichloride and tri-chloroethylene. Although the total solvent volume and the number of extractions are not critical in the process of this invention, we have found that the extraction is preferably accomplished, in terms of economy and efficiency in extracting the greatest amount of antibiotic with about an equal volume of the total filtrate volume and preferably in a multiplicity of extractions using portions of the total solvent volume for each extraction. Of course economically yields are obtained by single extractions also.

The antibiotic is recovered from the aforesaid solvent solution of the same by any one of those methods which are well known to those skilled in the art. Among these methods may be mentioned the preparation of the calcium salt of the antibiotic. In this method, a calcium salt such as calcium chloride is added to the organic solvent solution of the complex and the calcium salt of the antibiotic crystallizes therefrom. The crystals are filtered and dried to obtain a pure and stable product. An alternate procedure which is also well known to those familiar with the art comprises adding water to the organic solvent solution of the complex and acidifying to about pH 1.5 with a mineral acid, whereupon the antibiotic is extracted into the water phase. Stirring the two phases for a short time facilitates the extraction. After separating the phases, the organic solvent may be contrifuged to isolate more of the aqueous phase. The aqueous portions are combined and adjusted to a pH of from about 3 to about 4 with a basic reagent such as aqueous sodium hydroxide, potassium hydroxide, ammonium hydroxide or the like. The free base crystallizes from the solution. The crystals are filtered, washed with a lower alkanol and vacuum dried to obtain the pure product.

EXAMPLE I

To six liters of tetracycline fermentation broth is added 40 grams of oxalic acid and the acidity is adjusted to pH 2.0 with sulfuric acid. The mixture is stirred for 30 minutes and filtered. The filtrate, which assays 1312 γ/ml., is divided into 1500 ml. portions. Arquad L-15 (50% is isopropanol/water) is added to the samples in the amounts listed in Table I and the acidity is adjusted to pH 9.0 with 50% aqueous sodium hydroxide. The samples are extracted with 100 ml. of methyl isobutyl ketone. The ketone extract is analyzed by ultraviolet absorption analysis for the concentration of tetracycline.

TABLE I

| Sample | Arquad L-15 (50%) (ml.) | Tetracycline γ/ml. |
| --- | --- | --- |
| A | 1 | 28,500 |
| B | 2 | 37,300 |
| C | 3 | 43,930 |

The ketone extracts are clear, dark maroon and contain no observable undissolved impurities.

EXAMPLE II

To three, 1.8-liter samples of filtered and decalcified tetracycline fermentation broth are added respectively, 12 ml., 9.6 ml. and 7.2 ml. Arquad L-11 (50% solution). The acidity of each mixture was adjusted to pH 9.0 with 50% aqueous sodium hydroxide. Methyl isobutyl ketone, 350 ml., was added to each sample and the mixture was stirred for 30 minutes. The ketone was decanted from the aqueous portion and analyzed for tetracycline with the results shown in Table III.

TABLE II

| Sample | Arquad L-11 (ml.) | Ketone extractant tetracycline conc. (γ/ml.) | Million units |
|---|---|---|---|
| A | 12 | 16,430 | 6.0 |
| B | 9.6 | 15,975 | 6.1 |
| C | 7.2 | 17,780 | 6.1 |

The ketone extracts were clear and comparable in color to the extract obtained from Arquad L-15 in Example I. When this procedure is applied to decalcified and filtered fermentation broths containing oxytetracycline, chlortetracycline and 7 - chloro - 6 - demethyltetracycline similar results are obtained.

EXAMPLE III (A) To two, 4-liter portions of a decalcified and filtered tetracycline fermentation broth, assaying 6000 γ/ml. were added equimolar portions of a long chain dialkyl dimethylammonium chloride mixture (Arquad 2C) and a 2-methyl long chain alkyl trimethylammonium chloride mixture (Arquad L-15), respectively. The acidity of each sample was adjusted to pH 9.0 with 25% aqueous sodium hydroxide, 1300 ml. of methyl isobutyl ketone was added to each and the mixtures were stirred for 30 minutes. The organic phases were separated and assayed for tetracycline with the following results:

| Sample | Volume, MIBK (mil.) | γ/ml. | MU | Stepwise Yield, percent |
|---|---|---|---|---|
| L-15 | 1,225 | 18,084 | 22.1 | 92 |
| 2C | 1,220 | 16,276 | 19.9 | 83 |

(B) To each of 1-liter samples of the ketone extracts of part A was added 300 ml. distilled water. The acidity was adjusted to 1.5 by means of 25% aqueous sulfuric acid with stirring. The samples were stirred for an additional 15 minutes and the phases were separated. The rich aqueous phases were filtered and assayed for tetracycline with the following results:

| Sample | Volume, water (ml.) | γ/ml. | MU/100 ml. ketone | MU total |
|---|---|---|---|---|
| L-15 | 285 | 60,000 | 17.1 | 21.0 |
| 2C | 285 | 53,000 | 15.1 | 18.4 |

(C) The acidity of the aqueous extracts of part B were adjusted to pH 3.5 with 25% aqueous hydroxide. After a 3-hour granulation period, tetracycline crystals were filtered from each sample. The crystals were washed with distilled water and finally with a small amount of isopropyl alcohol to facilitate drying. The crystals were then dried for 12 hours at 60° C. in vacuo with the following shown in Table III:

TABLE III

| | Tetracycline product | | |
|---|---|---|---|
| Sample | Arquad salt | Million units,[1] total | Total |
| L-15 | 16.8 g. | 19 | 79% |
| 2C | 16.7 g. | 17 | 71% |
| Analysis of products: | | | |
| Sample | L-15 | | 2C |
| Solution clarity [2] | Clear | | Hazy, undissolved impurities present |
| Ash (percent) | 0.00 | | 0.21 |
| Water [3] (percent) | 10.8 | | 11.2 |
| Residual Arquad [4] (p.p.m.) | 114 | | 377 |
| Bio-Potency [5] (γ/mg.) | 992 | | 836 |
| Color | Light yellow | | Tan |
| Epitetracycline [6] (percent) | 4.9 | | 6.4 |

[1] U.V. absorption analysis.
[2] One gram in 10 ml. methanol containing 1 ml. 3 N hydrochloric acid.
[3] Karl Fischer water analysis.
[4] U. V. absorption analysis.
[5] Turbidimetric method, Microbiological Assay. Test Organism *Klebsiella pneumoniae*, ATCC 10031.
[6] Isolation of epimer by paper chromatography followed by U.V. absorption analysis.

To obtain a product equivalent in purity to the Arquad L-15 sample, the Arquad 2C sample would require one or more further recrystallizations with a yield loss of about 10% for each recrystallization.

EXAMPLE IV

When 45 ml. Arquad L-15 (50% in isopropanol/water) is added to 6.4 liters of a filtered and decalcified fermentation broth, assaying 4792 γ/ml. or 30.7 million units (MU) tetracycline, the pH is adjusted to 9.0 with 50% aqueous sodium hydroxide solution and the mixture is stirred for 30 minutes and allowed to precipitate, the resulting product, tetracycline, quaternary ammonium complex, is obtained in high yield and in excellent purity.

Similar results are obtained when this procedure is applied to filtered and decalcified fermentation broths containing oxytetracycline, chlortetracycline or 7-chloro-6-demethyltetracycline.

What is claimed is:

1. In the process for obtaining a complex of a tetracycline antibiotic from an aqueous medium containing a fermentation-produced tetracycline antibiotic obtained from a filtered and decalcified fermentation broth by reacting at least a molar equivalent amount of a quaternary ammonium salt therewith at a pH of from about 5 to about 12, the improvement wherein said quaternary ammonium salt has the formula:

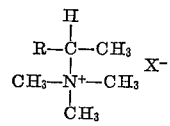

where R is alkyl having from 9 to 18 carbon atoms and X is chloride, bromide or iodide.

2. A process according to claim 1 wherein said aqueous medium is adjusted to a pH of between about 8 and 11.

3. A process according to claim 1 wherein the antibiotic quaternary ammonium complex is allowed to precipitate and is filtered from the aqueous system.

4. A process according to claim 1 wherein the antibiotic-quaternary ammonium complex is contacted with a water-immiscible polar organic solvent so as to extract the antibiotic-quaternary ammonium complex from said aqueous medium, the solvent extract is separated, and thereafter the antibiotic is isolated from the solvent extract.

5. A process according to claim 1 wherein said antibiotic is tetracycline.

6. A process according to claim 1 wherein said antibiotic is oxytetracycline.

7. A process according to claim 1 wherein said antibiotic is chlortetracycline.

8. A process according to claim 1 wherein said antibiotic is 7-chloro-6-demethyltetracycline.

References Cited

UNITED STATES PATENTS

| 2,734,018 | 2/1956 | Minieri et al. |
| 2,871,264 | 1/1959 | Minieri et al. |
| 2,873,276 | 2/1959 | Blase. |
| 2,875,247 | 2/1959 | Fox et al. |
| 3,037,973 | 6/1962 | Sarcona et al. |

NICHOLAS S. RIZZO, Primary Examiner

A. M. TIGHE, Assistant Examiner